US012770253B2

(12) United States Patent
Xie et al.

(10) Patent No.: US 12,770,253 B2
(45) Date of Patent: Oct. 20, 2026

(54) DISEASE-SPECIFIC LONGITUDINAL CHANGE ANALYSIS IN MEDICAL IMAGING

(71) Applicant: Siemens Healthineers AG, Forchheim (DE)

(72) Inventors: Long Xie, Chesterbrook, PA (US); Eli Gibson, Plainsboro, NJ (US); Gengyan Zhao, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 479 days.

(21) Appl. No.: 18/460,982

(22) Filed: Sep. 5, 2023

(65) Prior Publication Data

US 2025/0078258 A1 Mar. 6, 2025

(51) Int. Cl.

*G06T 7/00* (2017.01)
*G06T 3/40* (2006.01)
*G06T 9/00* (2006.01)
*G06V 10/44* (2022.01)
*G06V 10/764* (2022.01)

(52) U.S. Cl.

CPC .............. *G06T 7/0012* (2013.01); *G06T 3/40* (2013.01); *G06T 9/00* (2013.01); *G06V 10/44* (2022.01); *G06V 10/764* (2022.01); *G06T 2207/30016* (2013.01); *G06T 2207/30096* (2013.01)

(58) Field of Classification Search

CPC ........... G06T 7/0012; G06T 3/40; G06T 9/00; G06V 10/44; G06V 10/764

See application file for complete search history.

(56) References Cited

U.S. PATENT DOCUMENTS

| | | | | |
|---|---|---|---|---|
| 11,308,615 | B1 * | 4/2022 | Nessim | G06T 7/0016 |
| 11,464,583 | B2 * | 10/2022 | Sano | G06T 7/0012 |
| 11,842,492 | B2 * | 12/2023 | Ironside | G06T 7/0014 |
| 11,915,822 | B2 * | 2/2024 | Yi | G16H 50/20 |
| 2017/0035517 | A1 * | 2/2017 | Geri | A61B 34/20 |
| 2017/0046826 | A1 * | 2/2017 | Konen | A61B 5/0042 |
| 2017/0348056 | A1 * | 12/2017 | Steinle | A61B 34/10 |
| 2018/0217734 | A1 * | 8/2018 | Koenig | A61B 34/10 |
| 2018/0365824 | A1 * | 12/2018 | Yuh | A61B 6/032 |

(Continued)

OTHER PUBLICATIONS

Goceri et al, Review on Machine Learning Based Lesion Segmentation Methods from Brain MR Images, 2016 15th IEEE International Conference on machine Learning and Applications, 6 pages (Year: 2016).*

(Continued)

*Primary Examiner* — Mohammed H Zuberi

(57) ABSTRACT

Systems and methods for longitudinal change analysis are provided. A first medical image depicting an anatomical object at a first time and a second medical image depicting the anatomical object at a second time are received. The first medical image is encoded into a first set of features and the second medical image is encoded into a second set of features. The first set of features and the second set of features are encoded into a set of longitudinal features. A medical imaging analysis task is performed on longitudinal changes depicted in the first medical image and the second medical image using a machine learning based network based on the set of longitudinal features. Results of the medical imaging analysis task are output.

17 Claims, 6 Drawing Sheets

(56) References Cited

U.S. PATENT DOCUMENTS

| | | | | |
|---|---|---|---|---|
| 2020/0357120 | A1* | 11/2020 | Kang | G06T 7/30 |
| 2021/0015560 | A1* | 1/2021 | Boddington | A61B 34/10 |
| 2021/0204914 | A1* | 7/2021 | Meral | A61B 5/0035 |
| 2021/0401501 | A1* | 12/2021 | Avisar | G16H 50/70 |
| 2024/0303768 | A1* | 9/2024 | Li | G06T 15/00 |
| 2025/0285265 | A1* | 9/2025 | Chartrand | G06T 7/0012 |

OTHER PUBLICATIONS

Parivash et al., "Longitudinal changes in hippocampal subfield volume associated with collegiate football", Journal of Neurotrauma, 2019, pp. 1-12.
Avants et al., "A reproducible evaluation of ANTs similarity metric performance in brain image registration", NeuroImage, 2010, pp. 1-12.
Balakrishnan et al., "Voxelmorph: a learning framework for deformable medical image registration", arXiv:1809.05231v3, 2019, pp. 1-16.
Das et al., "Measuring longitudinal change in the hippocampal formation from in vivo high-resolution T2-weighted MRI", Neuroimage, 2012, pp. 1-28.
Dosovitskiy et al., "An image is worth 16x16 words: Transformers for image recognition at scale", arXiv:2010.11929v2, 2021, pp. 1-22.
Dong et al., "DeepAtrophy: Teaching a neural network to differentiate progressive changes from noise on longitudinal MRI in Alzheimer's Disease", arXiv:2010.12948v1, 2020, pp. 1-51.

* cited by examiner

DISEASE-SPECIFIC LONGITUDINAL CHANGE ANALYSIS IN MEDICAL IMAGING

TECHNICAL FIELD

The present invention relates generally to longitudinal change analysis, and in particular to disease-specific longitudinal change analysis in medical imaging.

BACKGROUND

The advancement of medical imaging technology coupled with the accumulation of longitudinal medical imaging data has significantly improved the ability for clinicians to visualize changes in the brain of patients due to diseases. Automatic quantification of disease-related longitudinal changes in medical imaging data serves an important role in the early detection and monitoring of disease progression. Such automatic quantification of disease-related longitudinal changes has significant utility, e.g., for personalized treatment planning and recommendations and for monitoring adverse side effects of recently produced drugs.

Conventionally, disease-related longitudinal changes are quantified using segmentation and registration techniques. However, such conventional segmentation and registration techniques are unable to detect sub-voxel changes and are unable to discriminate between disease-related changes with normal brain aging.

BRIEF SUMMARY OF THE INVENTION

In accordance with one or more embodiments, systems and methods for longitudinal change analysis are provided. A first medical image depicting an anatomical object at a first time and a second medical image depicting the anatomical object at a second time are received. The first medical image is encoded into a first set of features and the second medical image is encoded into a second set of features. The first set of features and the second set of features are encoded into a set of longitudinal features. A medical imaging analysis task is performed on longitudinal changes depicted in the first medical image and the second medical image using a machine learning based network based on the set of longitudinal features. Results of the medical imaging analysis task are output.

In one embodiment, the first medical image is encoded with first spatial information to generate the first set of features and the second medical image is encoded with second spatial information to generate the second set of features. In one embodiment, the first medical image is encoded with first spatial information by encoding the first medical image with one or more first coordinate maps and resampling the first medical image and the one or more first coordinate maps to a common resolution. The second medical image is encoded with second spatial information by encoding the second medical image with one or more second coordinate maps and resampling the second medical image and the one or more second coordinate maps to the common resolution. The one or more first coordinate maps define a location of each pixel in the first medical image relative to a reference coordinate system and the one or more second coordinate maps define a location of each pixel in the second medical image relative to the reference coordinate system.

In one embodiment, features representing the first medical image are combined with temporal information associated with the first medical image to generate the first set of features and features representing the second medical image are combined with temporal information associated with the second medical image to generate the second set of features.

In one embodiment, features representing the first medical image are combined with patient demographic information associated with the first medical image to generate the first set of features and features representing the second medical image are combined with patient demographic information associated with the second medical image to generate the second set of features.

In one embodiment, the first medical image and the second medical image are encoded using a feature extraction network. The feature extraction network is trained to perform a plurality of unsupervised medical imaging analysis tasks.

In one embodiment, the medical imaging analysis task comprises classification of the longitudinal changes depicted in the first medical image and the second medical image.

In one embodiment, the anatomical object comprises one or more lesions in a brain of a patient.

These and other advantages of the invention will be apparent to those of ordinary skill in the art by reference to the following detailed description and the accompanying drawings.

DETAILED DESCRIPTION

The present invention generally relates to methods and systems for disease-specific longitudinal change analysis in medical imaging. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Further, reference herein to pixels of an image may refer equally to voxels of an image and vice versa.

Embodiments described herein provide for an AI/ML (artificial intelligence/machine learning) system for longitudinal change analysis for accurately distinguishing between normal and disease-related changes in medical images of the brain of a patient. The AI/ML system comprises a feature extraction network for encoding longitudinal medical images with associated temporal information and patient demographic information. The AI/ML system further comprises a longitudinal encoding network that extracts longitudinal features from the encoded features of the feature extraction network to perform a medical imaging analysis task on longitudinal changes depicted in the medical images. Such longitudinal features can differentiate between normal and disease-related changes. Advantageously, embodiments described herein extract longitudinal features from raw medical images without relying on segmentation and registration. Such longitudinal features are more sensitive to subtle alterations in brain structures and provide for more accurate detection of disease-related changes, improved diagnostic accuracy, and better patient outcomes.

Figure 1:
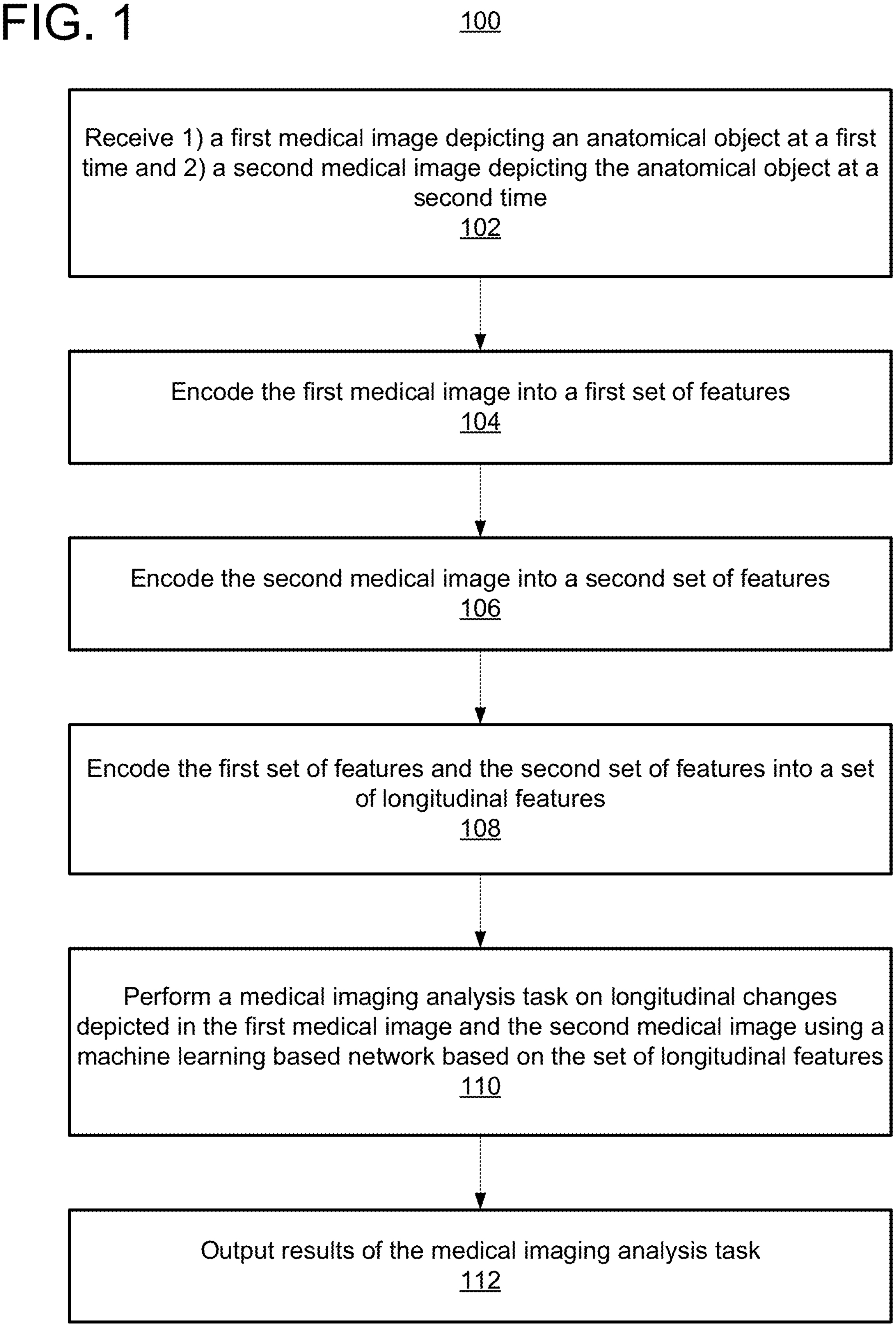
FIG. 1 shows a method for longitudinal change analysis of medical images, in accordance with one or more embodiments.
Figure 2:
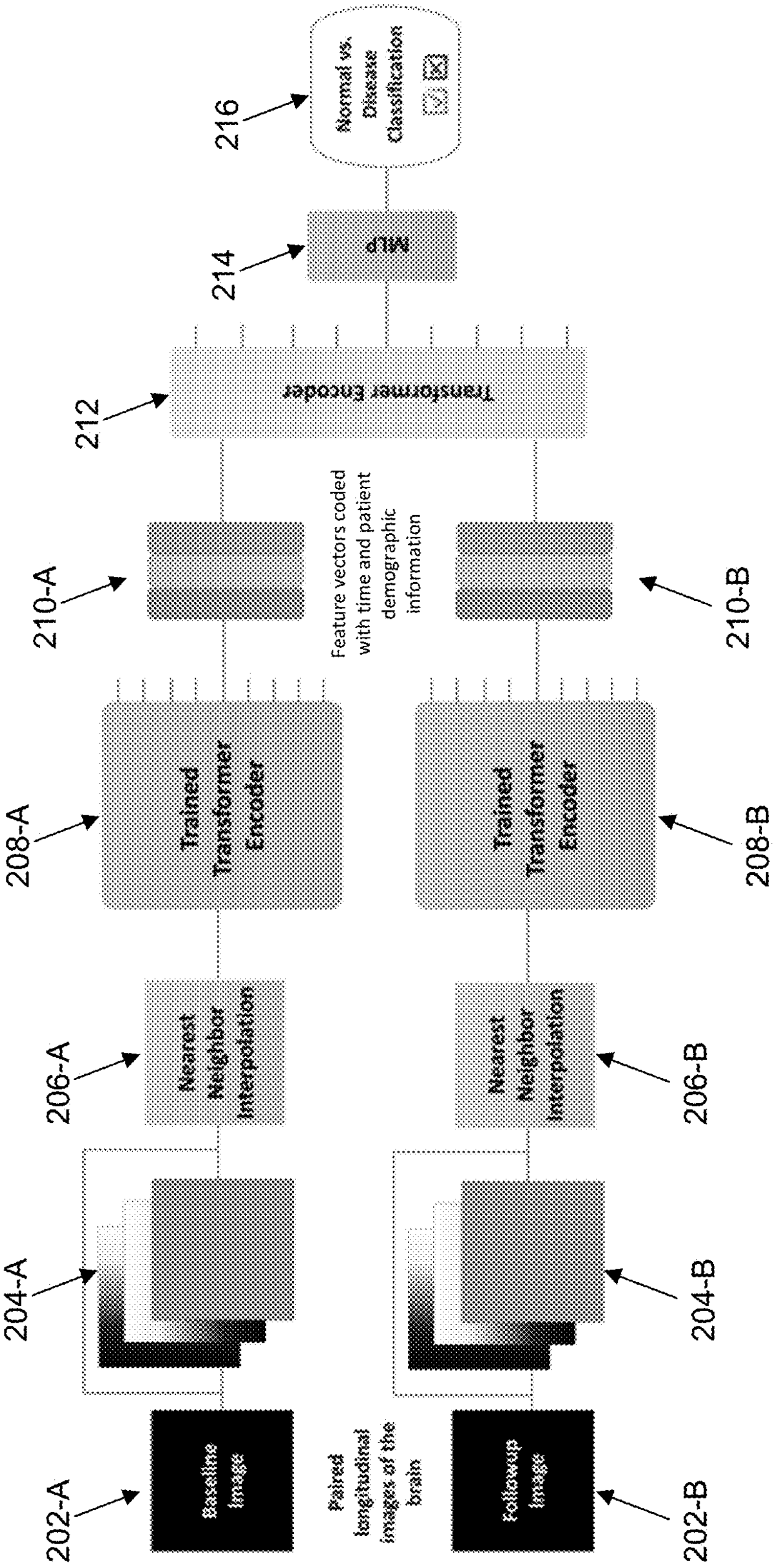
FIG. 2 shows a workflow for longitudinal change analysis of medical images, in accordance with one or more embodiments.

FIG. 1 shows a method 100 for longitudinal change analysis of medical images, in accordance with one or more embodiments. The steps of method 100 may be performed by one or more suitable computing devices, such as, e.g., computer 602 of FIG. 6. FIG. 2 shows a workflow 200 for longitudinal change analysis of medical images, in accordance with one or more embodiments. FIG. 1 and FIG. 2 will be described together.

At step 102 of FIG. 1, 1) a first medical image of an anatomical object at a first time and 2) a second medical image of the anatomical object at a second time are received. In one embodiment, the anatomical object is an abnormality (e.g., a lesion, a tumor, a nodule, a mass effect, etc.) in a brain of a patient. However, the anatomical object may be any other anatomical object of interest of the patient, such as, e.g., organs, bones, vessels, etc.

The first medical image may be a baseline image depicting the anatomical object at the first time and the second medical image may be a follow-up image depicting the anatomical object at the second time, where the second time is after the first time. In one example, as shown in workflow 200 of FIG. 2, the first medical image and the second medical image are baseline image 202-A and follow-up image 202-B (collectively referred to as images 202) respectively. The first medical image and the second medical image may be paired corresponding images of the anatomical object obtained through, e.g., coarse deformable registration to establish pointwise correspondence between the images.

The first medical image and/or the second medical image may be of any suitable modality, such as, e.g., CT (computed tomography), MRI (magnetic resonance imaging), ultrasound, x-ray, or any other medical imaging modality or combinations of medical imaging modalities. The first medical image and/or the second medical image may be 2D (two dimensional) images and/or 3D (three dimensional) volumes, and may comprise a single input medical image or a plurality of input medical images. The first medical image and/or the second medical image may be patches extracted from a raw medical image or may be the raw medical image.

In one embodiment, optionally, temporal information associated with the first medical image and temporal information associated with the second medical image are also received at step 102 of FIG. 1. The temporal information defines a time associated with the first medical image and the second medical image. The time associated with the first medical image and the second medical image may be a relative time (e.g., a time difference) associated with the first medical image and the second medical image.

In one embodiment, optionally, patient demographic information associated with the first medical image and the second medical image of the patient is also received at step 102 of FIG. 1. The patient demographic information may include, for example, age, race, ethnicity, gender, marital status, income, education, employment, geographic location, or any other suitable demographic information of the patient.

The first medical image, the second medical image, the temporal information, and/or the patient demographic information may be received, e.g., by loading the first medical image, the second medical image, the temporal information, and/or the patient demographic information from a storage or memory of a computer system, by receiving the first medical image, the second medical image, the temporal information, and/or the patient demographic information from a remote computer system, or by receiving the first medical image and/or the second medical image directly from an image acquisition device, such as, e.g., a CT scanner.

At step 104 of FIG. 1, the first medical image is encoded into a first set of features. At step 106 of FIG. 1, the second medical image is encoded into a second set of features. The first medical image and the second medical image may be respectively encoded by a machine learning based feature extraction network.

In accordance with one or more embodiments, to preserve information in the original raw images, the first medical image is encoded together with first spatial information using the feature extraction network and the second medical image is encoded together with the second spatial information using the feature extraction network. The first and second spatial information define a relative location of each pixel between the first medical image and the second medical image.

In one embodiment, the first medical image is encoded with first spatial information and the second medical image is encoded by the second spatial information using coordinate maps. For example, as shown in workflow 200 of FIG. 2, baseline image 202-A and follow-up image 202-B are respectively encoded with one or more coordinate maps 204-A and 204-B (collectively referred to as coordinate maps 204). In one example, each of coordinate maps 204-A and 204-B comprise three coordinate maps, one for each dimension (i.e., the X, Y, Z dimensions). Coordinate maps 204-A and 204-B define the location of each pixel in baseline image 202-A and 202-B respectively relative to a reference coordinate system (e.g., the real-world coordinate system). Coordinate maps 204 may be generated based on header information of images 202. Images 202 and coordinate maps 204 are resampled to a common resolution (e.g., 0.5×0.5×0.5 cubic millimeters) respectively using nearest neighbor interpolation 206-A and 206-B (collectively referred to as nearest neighbor interpolation 206) to maximally preserve the original image intensity and coordinate information. The resampled baseline image 202-A and the resampled follow-up image 202-B are respectively encoded, together with the resampled coordinate maps 204-A and 204-B, by trained transformer encoders 208-A and 208-B (collectively referred to as encoders 208) to generate feature vectors 210-A and 210-B (collectively referred to as feature vectors 210). While encoders 208 are separately and individually show in workflow 200, it should be understood that encoders 208 are the same encoder.

The feature extraction network respectively receives as input the resampled first medical image and the resampled second medical image, together with the resampled first coordinate maps and the resampled second coordinate maps, and respectively generate as output the first set of features and the second set of features. The first set of features and the second set of features represent low-level latent features or embeddings respectively representing the first medical image and the second medical image. The first set of features and the second set of features may be represented as feature vectors.

In one embodiment, for example where temporal information is received at step 102 of FIG. 1, the features representing from the first medical image are combined (e.g., concatenated) with the temporal information associated with the first medical image to generate the first set of features and the features representing from the second medical image are combined with the temporal information associated with the second medical image to generate the second set of features. In one embodiment, for example where patient demographic information is received at step 102 of FIG. 1, the features representing from the first medical image are combined with the patient demographic information associated with the first medical image to generate the first set of features and the features representing from the second medical image are combined with the patient demographic information associated with the second medical image to generate the second set of features.

Combining the features representing the first medical image and the second medical image with temporal information and/or patient demographic information ensures that the time span and population characteristics are taken into account when making decisions about longitudinal changes. For example, an amount of change may be considered abnormal if it occurs over a short period of time or in a certain population, but may be considered normal if it occurs over a longer period of time or in a different population.

To combine the features representing the first or second medical images with the temporal information, in one embodiment, a vector is appended to the feature vector extracted from the first medical image and to the feature vector extracted from the second medical image representing a relative time (e.g., a time difference). Similarly, to combine the features representing the first or second medical images with the patient demographic information, a vector is appended to the feature vectors extracted from the first medical image and the second medical image representing the demographic information.

Accordingly, the first set of features and the second set of features comprise one or more of: 1) features representing from the first medical image or the second medical image respectively, 2) features representing the temporal information associated with the first medical image or the second medical image respectively, and 3) features representing patient demographic information associated with the first medical image or the second medical image respectively.

In one embodiment, the first medical image is encoded with first spatial information and the second medical image is encoded by the second spatial information using sinusoidal positional embeddings, and the encoded first medical image and the encoded second medical image are respectively encoded by the first feature extraction network and the second feature extraction network into the first set of features and the second set of features. The first medical image and the second medical image may be encoded with spatial information using any other suitable approach.

In one embodiment, the feature extraction networks are vision transformer encoder networks. However, the feature extraction networks may be of any other suitable architecture. The feature extraction networks are trained during a prior offline or training stage. In one embodiment, the feature extraction networks are trained as discussed with respect to FIG. 3. Once trained, the feature extraction networks are applied during an online or inference stage, e.g., to perform steps 104 and 106 of FIG. 1.

At step 108 of FIG. 1, the first set of features and the second set of features are encoded into a set of longitudinal features. In one embodiment, the first set of features and the second set of features are encoded using a machine learning based encoder network. In one embodiment, the machine learning based encoder network is a transformer encoder, but may be of any other suitable architecture. The machine learning based encoder network receives as input the first set of features and the second set of features and generates as output the set of longitudinal features. In one example, as shown in workflow 200 of FIG. 2, transformer encoder 212 receives as input feature vectors 210 and generates as output longitudinal features (not shown).

At step 110 of FIG. 1, a medical imaging analysis task is performed on longitudinal changes depicted in the first medical image and the second medical image using a machine learning based network based on the set of longitudinal features. In one embodiment, the medical imaging analysis task is classification of the longitudinal changes in the first medical image and the second medical image, for example, as being normal or disease-related changes or normal, stable-disease, or disease-related changes. However, the medical imaging analysis task may be any other suitable medical imaging analysis task on the longitudinal changes in the first medical imaging and the second medical image, such as, e.g., quantification or detection.

In one embodiment, the machine learning based network is an MLP (multilayer perceptron). However, the machine learning based network may be of any other suitable architecture. The machine learning based network receives as input the set of longitudinal features and generates as output the results of the medical imaging analysis task. For example, as shown in workflow 200 of FIG. 2, MLP 214 receives as input the longitudinal features output from transformer encoder 212 and generates as output results 216 classifying the longitudinal change depicted in baseline image 202-A and follow-up image 202-B as normal or disease related changes. The machine learning based network is trained during a prior offline or training stage. In one embodiment, the machine learning based network is trained as discussed with respect to FIG. 3. Once trained, the machine learning based network is applied during an online or inference stage, e.g., to perform step 108 of FIG. 1.

At step 112 of FIG. 1, results of the medical imaging analysis task are output. For example, the results of the medical imaging analysis task can be output by displaying the results of the medical imaging analysis task on a display device of a computer system, storing the results of the medical imaging analysis task on a memory or storage of a computer system, or by transmitting the results of the medical imaging analysis task to a remote computer system.

In one embodiment, a sliding window approach may be utilized to extract first medical images and the second medical images from original raw images and method 100 of FIG. 1 is repeatedly performed for each pair of the respective first medical image and the respective second medical image. The results of the medical imaging analysis task (output at step 112 of FIG. 1) may be aggregated to generate a heatmap of normal or disease-related changes. The heatmap can be used to generate a diagnosis or to highlight areas of the anatomical object affected by disease-related changes.

Advantageously, embodiments described herein extract the first medical image and the second medical image while preserving information in the original raw images. Medical images often have anisotropic voxel size, with thick slices commonly used in clinical settings. Conventionally, a follow-up image is resampled to the space of a baseline image to extract longitudinal patches. However, such conventional resampling can alter information from original raw medical images, which is suboptimal for evaluating longitudinal changes, particularly in the early stages of diseases. In accordance with embodiments described herein, to preserve information in the original raw images, the first medical image is encoded together with first spatial information and the second medical image is encoded together with the second spatial information.

In addition, by directly extracting longitudinal image information from raw images without relying on segmentation and registration, embodiments described herein may be more sensitive to subtle longitudinal changes in brain structures, resulting in more accurate detection of disease-related changes and improving diagnostic accuracy. Embodiments described herein are capable of discriminating between disease-related longitudinal changes and normal progression of the brain, resulting in more accurate disease detection and better patient outcomes.

Figure 3:
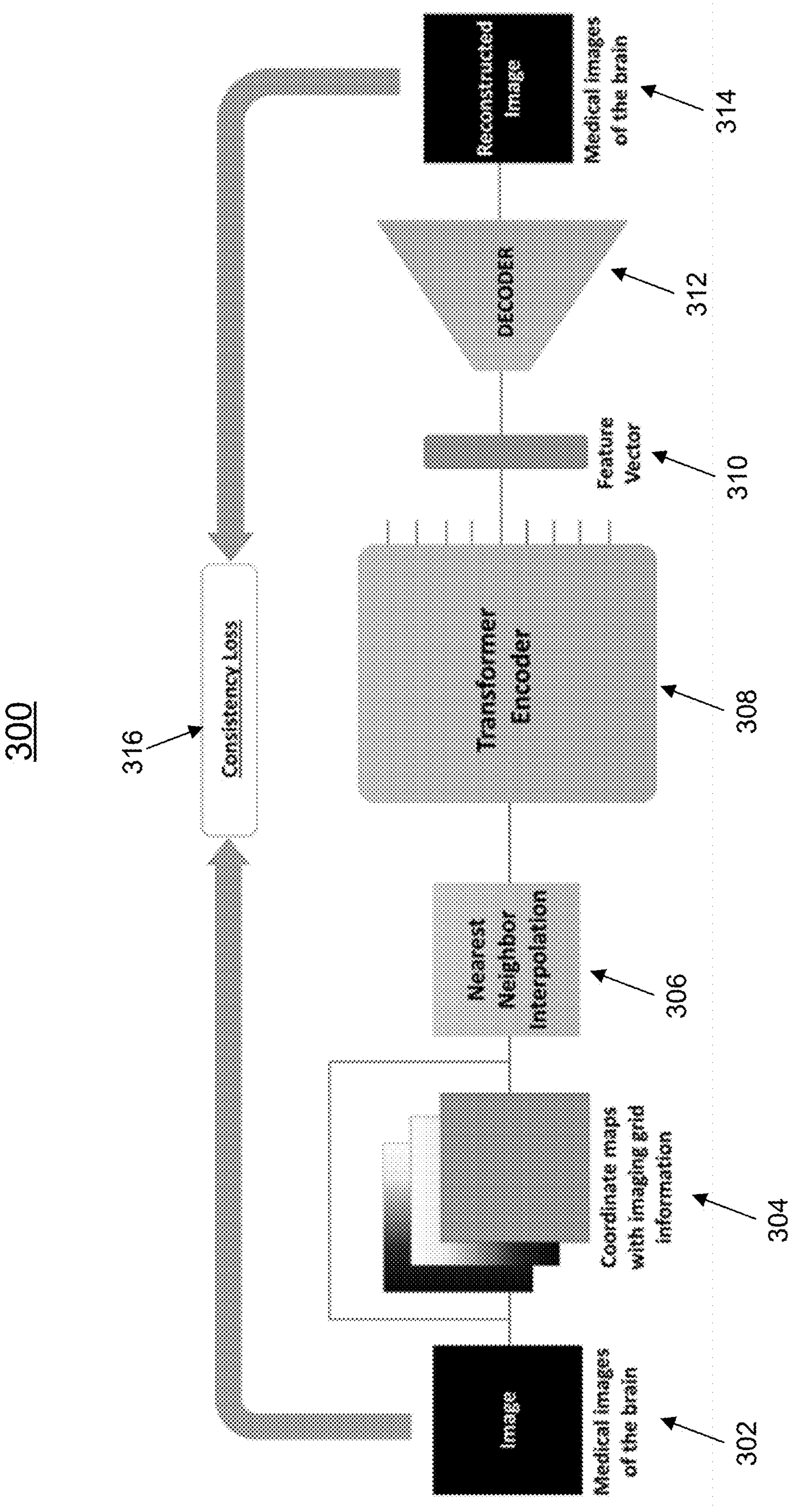
FIG. 3 shows a workflow 300 training a transformer encoder for encoding a medical image into a set of features, in accordance with one or more embodiments.

FIG. 3 shows a workflow 300 for training a transformer encoder for encoding a medical image into a set of features, in accordance with one or more embodiments. Workflow 300 is performed during an offline or training stage for training transformer encoder 308. Once trained, the trained transformer network 308 may be applied during an online or inference stage. For example, transformer encoder 308 of workflow 300 may be applied as the feature extraction network utilized at steps 104 or 106 of FIG. 1 of transformer encoders 208-A or 208-B of FIG. 2.

Transformer encoder 308 is trained for performing a one or more unsupervised medical imaging analysis tasks. For example, as shown in workflow 300, transformer encoder 308 is trained for image reconstruction to generate reconstructed images 314 from images 302, but may additionally or alternatively trained to perform any other unsupervised medical imaging analysis task, such as, e.g., image modality translation, image unscrambling, missing image part completion, etc. to gain a comprehensive understanding of 3D medical images. Transformer encoder 308 is trained in an unsupervised manner, such that manual annotations are not necessary. The architecture of transformer encoder 308 remains the same when training for performing the one or more unsupervised medical imaging analysis tasks and weights are carried over between medical imaging analysis tasks. To increase the sample size and enable inclusion of single timepoint subjects, images 302 are cross-sectional images of a brain of a patient. To model local 3D structures and reduce computational burden, images 302 are 3D patches extracted from original raw images. Images 302 may be sampled from a multi-site, multi-model database representative of different imaging modalities, disease statuses, and acquisition protocols.

To preserve original image information, 3D coordinate maps 304 with imaging grid information are incorporated with images 302 for training transformer encoder 308. Coordinate maps 304 are generated in three dimensions with coordinates accounting for spatial information. Images 304 and coordinate maps 304 are resampled to a common resolution (e.g., 0.5×0.5×0.5 cubic millimeters) using nearest neighbor interpolation 306. Transformer encoder 308 is trained on the resampled images 308 and resampled coordinate maps 304 to encode image information into a feature vector 310. Decoder 312 decodes feature vector 310 to generate reconstructed images 314 (or any other suitable image in accordance with the unsupervised medical imaging analysis task). Images 302 and reconstructed images 314 are compared via consistency loss 316.

One advantage of the encoding performed in accordance with embodiments described herein is that coordinate maps 304 provide important information for transformer encoder 308 to learn spatial aspects in addition to the raw image intensity pattern. Accordingly, embodiments described herein preserves the original information for the raw images, which can be important for accurately evaluating longitudinal changes in medical images.

Once transformer encoder 308 is trained, a longitudinal encoding network is trained. The longitudinal encoding network comprises transformer encoder 308, another transformer encoder network (e.g., transformer encoder 212 of FIG. 2) for encoding the features output from transformer encoder 308 to a set of longitudinal features, and a machine learning based network (e.g., MLP 214) for performing a medical imaging analysis task based on the set of longitudinal features. While transformer encoder 308 of trained according to workflow 300 of FIG. 3, its weights are not fixed and may be updated during training of the longitudinal encoding network.

The longitudinal encoding network is trained on pairs of longitudinal images of the same subjects. Regions with abnormal anatomy, such as lesions or mass effect, may be manually annotated for each image. 3D patch pairs with a baseline image depicting no abnormality and a follow-up image depicting an abnormality (with abnormal annotations) are sampled and considered as disease-related changes. 3D patch pairs with both baseline and follow-up images depicting no abnormality are labeled as patches with normal changes. It is noted that normal patch pairs can be sampled in the unaffected brain regions from cases with partial brain abnormality. Synthetic lesions can be added to normal images to augment the training data further.

To capture brain changes that do not have a mass effect, such as, e.g., atrophy in the medical temporal lobe due to Alzheimer's disease and related dementia, brain images of patients at different stages of disease progression (e.g., significantly worse memory test score, change of diagnosis, etc.) are considered to depict disease-related changes. Longitudinal images for patients who remain p-amyloid negative cognitively normal controls are considered to have normal brain aging.

In one embodiment, instead of attempting to identify disease-related changes for all types of diseases, performance of the embodiments described herein may be evaluated on a few well-studied diseases, such as, e.g., Alzheimer's disease and brain lesion quantification. This would allow for a more targeted and focused evaluation, as well as potentially facilitating easier integration with existing clinical workflows and decision-making processes.

In one embodiment, the feature extraction network utilized at steps 104 and 106 of FIG. 1 is trained using 2D transformer encoders. 3D information can then be encoded in the encoders by performing an unsupervised task of predicting neighborhood slides. In another embodiment, a second level transformer is may be trained taking in feature vectors of 2D slices to perform unsupervised medical imaging analysis task. These approaches can potentially improve the performance of the feature extraction network for relatively limited sample size of medical images.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based models, as well as with respect to methods and systems for training machine learning based models. Features, advantages or alternative embodiments herein can be assigned to the other claimed objects and vice versa. In other words, claims for methods and systems for training a machine learning based model can be improved with features described or claimed in context of the methods and systems for utilizing a trained machine learning based model, and vice versa.

In particular, the trained machine learning based models applied in embodiments described herein can be adapted by the methods and systems for training the machine learning based models. Furthermore, the input data of the trained machine learning based model can comprise advantageous features and embodiments of the training input data, and vice versa. Furthermore, the output data of the trained machine learning based model can comprise advantageous features and embodiments of the output training data, and vice versa.

In general, a trained machine learning based model mimics cognitive functions that humans associate with other human minds. In particular, by training based on training data, the trained machine learning based model is able to adapt to new circumstances and to detect and extrapolate patterns.

In general, parameters of a machine learning based model can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based model can be adapted iteratively by several steps of training.

In particular, a trained machine learning based model can comprise a neural network, a support vector machine, a decision tree, and/or a Bayesian network, and/or the trained machine learning based model can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 4:
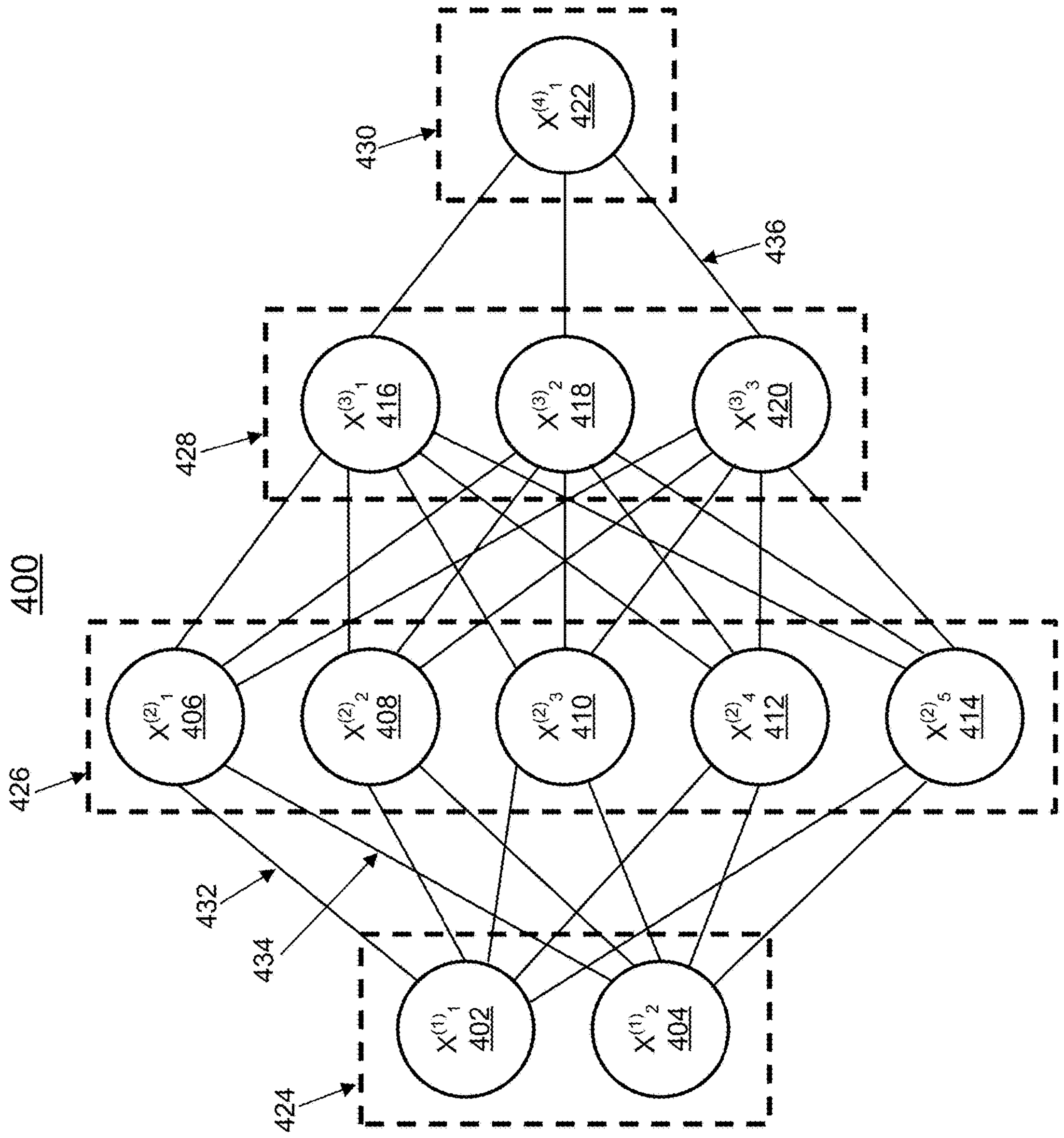
FIG. 4 shows an exemplary artificial neural network that may be used to implement one or more embodiments.

FIG. 4 shows an embodiment of an artificial neural network 400, in accordance with one or more embodiments. Alternative terms for "artificial neural network" are "neural network", "artificial neural net" or "neural net". Machine learning networks described herein, such as, e.g., the machine learning based networks utilized at steps 104, 106, 108, and 110 of FIG. 1, trained transformer encoder 208, transformer encoder 212, and MLP 214 of FIG. 2, and transformer encoder 308 of FIG. 3, may be implemented using artificial neural network 400.

The artificial neural network 400 comprises nodes 402-422 and edges 432, 434, . . . , 436, wherein each edge 432, 434, . . . , 436 is a directed connection from a first node 402-422 to a second node 402-422. In general, the first node 402-422 and the second node 402-422 are different nodes 402-422, it is also possible that the first node 402-422 and the second node 402-422 are identical. For example, in FIG. 4, the edge 432 is a directed connection from the node 402 to the node 406, and the edge 434 is a directed connection from the node 404 to the node 406. An edge 432, 434, . . . , 436 from a first node 402-422 to a second node 402-422 is also denoted as "ingoing edge" for the second node 402-422 and as "outgoing edge" for the first node 402-422.

In this embodiment, the nodes 402-422 of the artificial neural network 400 can be arranged in layers 424-430, wherein the layers can comprise an intrinsic order introduced by the edges 432, 434, . . . , 436 between the nodes 402-422. In particular, edges 432, 434, . . . , 436 can exist only between neighboring layers of nodes. In the embodiment shown in FIG. 4, there is an input layer 424 comprising only nodes 402 and 404 without an incoming edge, an output layer 430 comprising only node 422 without outgoing edges, and hidden layers 426, 428 in-between the input layer 424 and the output layer 430. In general, the number of hidden layers 426, 428 can be chosen arbitrarily. The number of nodes 402 and 404 within the input layer 424 usually relates to the number of input values of the neural network 400, and the number of nodes 422 within the output layer 430 usually relates to the number of output values of the neural network 400.

In particular, a (real) number can be assigned as a value to every node 402-422 of the neural network 400. Here, $$x^{(n)}_i$$

denotes the value of the i-th node 402-422 of the n-th layer 424-430. The values of the nodes 402-422 of the input layer 424 are equivalent to the input values of the neural network 400, the value of the node 422 of the output layer 430 is equivalent to the output value of the neural network 400. Furthermore, each edge 432, 434, . . . , 436 can comprise a weight being a real number, in particular, the weight is a real number within the interval [−1, 1] or within the interval [0, 1]. Here, $$w^{(m,n)}_{i,j}$$

denotes the weight of the edge between the i-th node 402-422 of the m-th layer 424-430 and the j-th node 402-422 of the n-th layer 424-430. Furthermore, the abbreviation $$w^{(n)}_{i,j}$$

is defined for the weight $$w^{(n,n+1)}_{i,j}.$$

In particular, to calculate the output values of the neural network 400, the input values are propagated through the neural network. In particular, the values of the nodes 402-422 of the (n+1)-th layer 424-430 can be calculated based on the values of the nodes 402-422 of the n-th layer 424-430 by $$x_j^{(n+1)} = f\left(\sum_i x_i^{(n)} \cdot w_{i,j}^{(n)}\right).$$

Herein, the function $f$ is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 424 are given by the input of the neural network 400, wherein values of the first hidden layer 426 can be calculated based on the values of the input layer 424 of the neural network, wherein values of the second hidden layer 428 can be calculated based in the values of the first hidden layer 426, etc.

In order to set the values $$w^{(m,n)}{}_{i,j}$$

for the edges, the neural network 400 has to be trained using training data. In particular, training data comprises training input data and training output data (denoted as $t_i$). For a training step, the neural network 400 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 400 (backpropagation algorithm). In particular, the weights are changed according to $$w_{i,j}^{\top(n)} = w_{i,j}^{(n)} - \gamma \cdot \delta_j^{(n)} \cdot x_i^{(n)}$$

wherein $\gamma$ is a learning rate, and the numbers $$\delta^{(n)}{}_j$$

can be recursively calculated as $$\delta_j^{(n)} = \left(\sum\nolimits_k \delta_k^{(n+1)} \cdot w_{j,k}^{(n+1)}\right) \cdot f^{\top}\left(\sum\nolimits_i x_i^{(n)} \cdot w_{i,j}^{(n)}\right)$$

based on $$\delta^{(n+1)}{}_j,$$

if the (n+1)-th layer is not the output layer, and $$\delta_j^{(n)} = \left(x_k^{(n+1)} - t_j^{(n+1)}\right) \cdot f^{\top}\left(\sum\nolimits_i x_i^{(n)} \cdot w_{i,j}^{(n)}\right)$$

if the (n+1)-th layer is the output layer 430, wherein $f'$ is the first derivative of the activation function, and $$y^{(n+1)}{}_j$$

is the comparison training value for the j-th node of the output layer 430.

Figure 5:
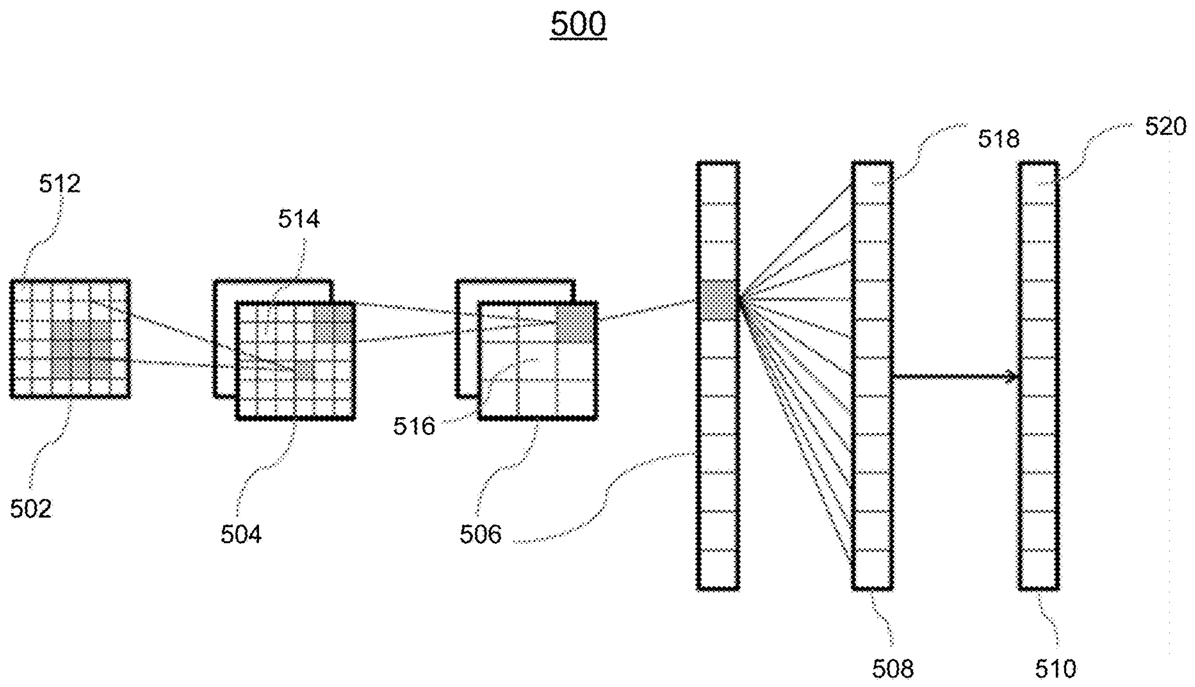
FIG. 5 shows a convolutional neural network that may be used to implement one or more embodiments.

FIG. 5 shows a convolutional neural network 500, in accordance with one or more embodiments. Machine learning networks described herein, such as, e.g., the machine learning based networks utilized at steps 104, 106, 108, and 110 of FIG. 1, trained transformer encoder 208, transformer encoder 212, and MLP 214 of FIG. 2, and transformer encoder 308 of FIG. 3, may be implemented using convolutional neural network 500.

In the embodiment shown in FIG. 5, the convolutional neural network comprises 500 an input layer 502, a convolutional layer 504, a pooling layer 506, a fully connected layer 508, and an output layer 510. Alternatively, the convolutional neural network 500 can comprise several convolutional layers 504, several pooling layers 506, and several fully connected layers 508, as well as other types of layers. The order of the layers can be chosen arbitrarily, usually fully connected layers 508 are used as the last layers before the output layer 510.

In particular, within a convolutional neural network 500, the nodes 512-520 of one layer 502-510 can be considered to be arranged as a d-dimensional matrix or as a d-dimensional image. In particular, in the two-dimensional case the value of the node 512-520 indexed with i and j in the n-th layer 502-510 can be denoted as $$x^{(n)}[i,j].$$

However, the arrangement of the nodes 512-520 of one layer 502-510 does not have an effect on the calculations executed within the convolutional neural network 500 as such, since these are given solely by the structure and the weights of the edges.

In particular, a convolutional layer 504 is characterized by the structure and the weights of the incoming edges forming a convolution operation based on a certain number of kernels. In particular, the structure and the weights of the incoming edges are chosen such that the values $$x^{(n)}{}_k$$

of the nodes 514 of the convolutional layer 504 are calculated as a convolution $$x^{(n)}{}_k = K_k * x^{(n-1)}$$

based on the values $x^{(n-1)}$ of the nodes 512 of the preceding layer 502, where the convolution * is defined in the two-dimensional case as $$x_k^{(n)}[i,j] = \left(K_k * x^{(n-1)}\right)[i,j] = \sum\nolimits_{i'} \sum\nolimits_{j'} K_k[i',j'] \cdot x^{(n-1)}[i-i', j-j'].$$

Here the k-th kernel $K_k$ is a d-dimensional matrix (in this embodiment a two-dimensional matrix), which is usually small compared to the number of nodes 512-518 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 512-520 in the respective layer 502-510. In particular, for a convolutional layer 504, the number of nodes 514 in the convolutional layer is equivalent to the number of nodes 512 in the preceding layer 502 multiplied with the number of kernels.

If the nodes 512 of the preceding layer 502 are arranged as a d-dimensional matrix, using a plurality of kernels can be interpreted as adding a further dimension (denoted as "depth" dimension), so that the nodes 514 of the convolutional layer 504 are arranged as a (d+1)-dimensional matrix. If the nodes 512 of the preceding layer 502 are already arranged as a (d+1)-dimensional matrix comprising a depth dimension, using a plurality of kernels can be interpreted as expanding along the depth dimension, so that the nodes 514 of the convolutional layer 504 are arranged also as a (d+1)-dimensional matrix, wherein the size of the (d+1)-dimensional matrix with respect to the depth dimension is by a factor of the number of kernels larger than in the preceding layer 502.

The advantage of using convolutional layers 504 is that spatially local correlation of the input data can exploited by enforcing a local connectivity pattern between nodes of adjacent layers, in particular by each node being connected to only a small region of the nodes of the preceding layer.

In embodiment shown in FIG. 5, the input layer 502 comprises 36 nodes 512, arranged as a two-dimensional 6×6 matrix. The convolutional layer 504 comprises 72 nodes 514, arranged as two two-dimensional 6×6 matrices, each of the two matrices being the result of a convolution of the values of the input layer with a kernel. Equivalently, the nodes 514 of the convolutional layer 504 can be interpreted as arranges as a three-dimensional 6×6×2 matrix, wherein the last dimension is the depth dimension.

A pooling layer 506 can be characterized by the structure and the weights of the incoming edges and the activation function of its nodes 516 forming a pooling operation based on a non-linear pooling function $f$. For example, in the two dimensional case the values $x^{(n)}$ of the nodes 516 of the pooling layer 506 can be calculated based on the values $x^{(n-1)}$ of the nodes 514 of the preceding layer 504 as $$x^{(n)}[i, j] = f\left(x^{(n-1)}[id_1, jd_2], \ldots , x^{(n-1)}[id_1 + d_1 - 1, jd_2 + d_2 - 1]\right)$$

In other words, by using a pooling layer 506, the number of nodes 514, 516 can be reduced, by replacing a number d1·d2 of neighboring nodes 514 in the preceding layer 504 with a single node 516 being calculated as a function of the values of said number of neighboring nodes in the pooling layer. In particular, the pooling function $f$ can be the max-function, the average or the L2-Norm. In particular, for a pooling layer 506 the weights of the incoming edges are fixed and are not modified by training.

The advantage of using a pooling layer 506 is that the number of nodes 514, 516 and the number of parameters is reduced. This leads to the amount of computation in the network being reduced and to a control of overfitting.

In the embodiment shown in FIG. 5, the pooling layer 506 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 508 can be characterized by the fact that a majority, in particular, all edges between nodes 516 of the previous layer 506 and the nodes 518 of the fully-connected layer 508 are present, and wherein the weight of each of the edges can be adjusted individually.

In this embodiment, the nodes 516 of the preceding layer 506 of the fully-connected layer 508 are displayed both as two-dimensional matrices, and additionally as non-related nodes (indicated as a line of nodes, wherein the number of nodes was reduced for a better presentability). In this embodiment, the number of nodes 518 in the fully connected layer 508 is equal to the number of nodes 516 in the preceding layer 506. Alternatively, the number of nodes 516, 518 can differ.

Furthermore, in this embodiment, the values of the nodes 520 of the output layer 510 are determined by applying the Softmax function onto the values of the nodes 518 of the preceding layer 508. By applying the Softmax function, the sum the values of all nodes 520 of the output layer 510 is 1, and all values of all nodes 520 of the output layer are real numbers between 0 and 1.

A convolutional neural network 500 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 500 can be trained based on the backpropagation algorithm. For preventing overfitting, methods of regularization can be used, e.g. dropout of nodes 512-520, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-3. Certain steps or functions of the methods and workflows described herein, including one or more of the steps or functions of FIGS. 1-3, may be performed by a server or by another processor in a network-based cloud-computing system. Certain steps or functions of the methods and workflows described herein, including one or more of the steps of FIGS. 1-3, may be performed by a client computer in a network-based cloud computing system. The steps or functions of the methods and workflows described herein, including one or more of the steps of FIGS. 1-3, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
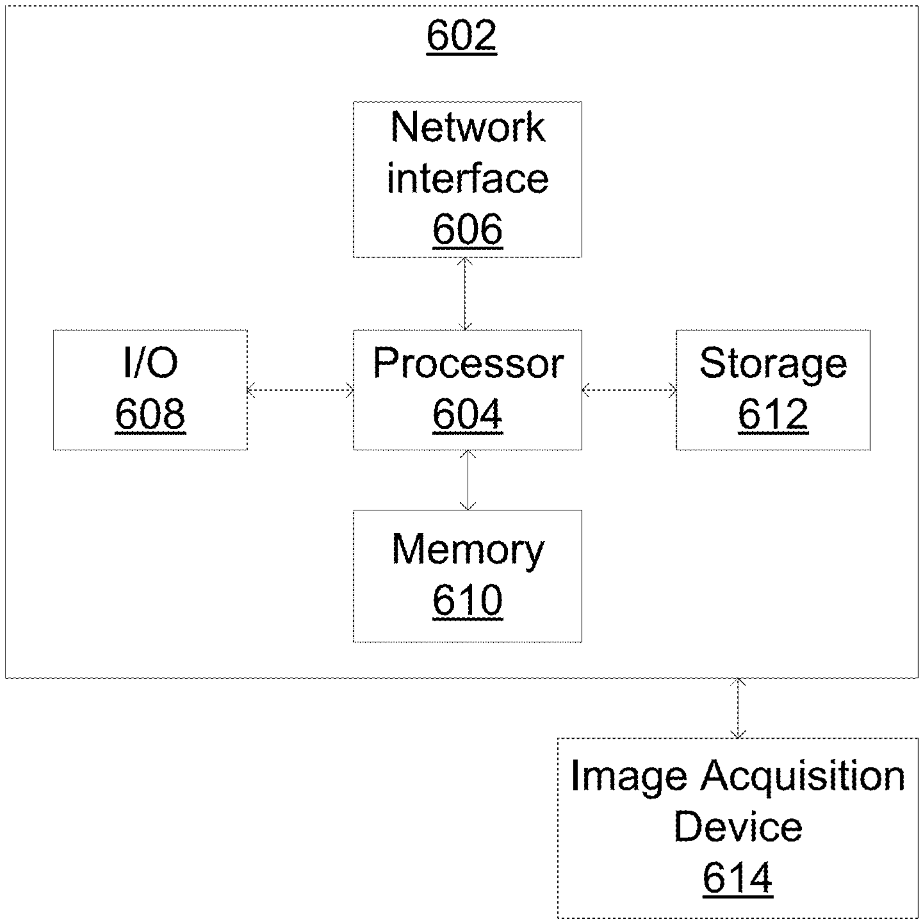
FIG. 6 shows a high-level block diagram of a computer that may be used to implement one or more embodiments.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIGS. 1-3 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIGS. 1-3. Accordingly, by executing the computer program instructions, the processor 604 executes the method and workflow steps or functions of FIGS. 1-3. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

Independent of the grammatical term usage, individuals with male, female or other gender identities are included within the term.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The following is a list of non-limiting illustrative embodiments disclosed herein:

Illustrative embodiment 1. A computer-implemented method comprising: receiving 1) a first medical image depicting an anatomical object at a first time and 2) a second medical image depicting the anatomical object at a second time; encoding the first medical image into a first set of features; encoding the second medical image into a second set of features; encoding the first set of features and the second set of features into a set of longitudinal features; performing a medical imaging analysis task on longitudinal changes depicted in the first medical image and the second medical image using a machine learning based network based on the set of longitudinal features; and outputting results of the medical imaging analysis task.

Illustrative embodiment 2. The computer-implemented method of illustrative embodiment 1, wherein: encoding the first medical image into a first set of features comprises encoding the first medical image with first spatial information to generate the first set of features, and encoding the second medical image into a second set of features comprises encoding the second medical image with second spatial information to generate the second set of features.

Illustrative embodiment 3. The computer-implemented method according to one of the preceding embodiments, wherein: encoding the first medical image with first spatial information to generate the first set of features comprises: encoding the first medical image with one or more first coordinate maps, and resampling the first medical image and the one or more first coordinate maps to a common resolution; and encoding the second medical image with second spatial information to generate the second set of features comprises: encoding the second medical image with one or more second coordinate maps, and resampling the second medical image and the one or more second coordinate maps to the common resolution.

Illustrative embodiment 4. The computer-implemented method according to one of the preceding embodiments, wherein the one or more first coordinate maps define a location of each pixel in the first medical image relative to a reference coordinate system and the one or more second coordinate maps define a location of each pixel in the second medical image relative to the reference coordinate system.

Illustrative embodiment 5. The computer-implemented method according to one of the preceding embodiments, wherein: encoding the first medical image into a first set of features comprises combining features representing the first medical image with temporal information associated with the first medical image to generate the first set of features, and encoding the second medical image into a second set of features comprises combining features representing the second medical image with temporal information associated with the second medical image to generate the second set of features.

Illustrative embodiment 6. The computer-implemented method according to one of the preceding embodiments, wherein: encoding the first medical image into a first set of features comprises combining features representing the first medical image with patient demographic information associated with the first medical image to generate the first set of features, and encoding the second medical image into a second set of features comprises combining features representing the second medical image with patient demographic information associated with the second medical image to generate the second set of features.

Illustrative embodiment 7. The computer-implemented method according to one of the preceding embodiments, wherein: encoding the first medical image into a first set of features comprises encoding the first medical image using a feature extraction network, encoding the second medical image into a second set of features comprises encoding the second medical image using the feature extraction network, and wherein the feature extraction network is trained to perform a plurality of unsupervised medical imaging analysis tasks.

Illustrative embodiment 8. The computer-implemented method according to one of the preceding embodiments, wherein the medical imaging analysis task comprises classification of the longitudinal changes depicted in the first medical image and the second medical image.

Illustrative embodiment 9. The computer-implemented method according to one of the preceding embodiments, wherein the anatomical object comprises one or more lesions in a brain of a patient.

Illustrative embodiment 10. An apparatus comprising: means for receiving 1) a first medical image depicting an anatomical object at a first time and 2) a second medical image depicting the anatomical object at a second time; means for encoding the first medical image into a first set of features; means for encoding the second medical image into a second set of features; means for encoding the first set of features and the second set of features into a set of longitudinal features; means for performing a medical imaging analysis task on longitudinal changes depicted in the first medical image and the second medical image using a machine learning based network based on the set of longitudinal features; and means for outputting results of the medical imaging analysis task.

Illustrative embodiment 11. The apparatus of illustrative embodiment 10, wherein: the means for encoding the first medical image into a first set of features comprises means for encoding the first medical image with first spatial information to generate the first set of features, and the means for encoding the second medical image into a second set of features comprises means for encoding the second medical image with second spatial information to generate the second set of features.

Illustrative embodiment 12. The apparatus of any one of illustrative embodiments 10-11, wherein: the means for encoding the first medical image with first spatial information to generate the first set of features comprises: means for encoding the first medical image with one or more first coordinate maps, and means for resampling the first medical image and the one or more first coordinate maps to a common resolution; and the means for encoding the second medical image with second spatial information to generate the second set of features comprises: means for encoding the second medical image with one or more second coordinate maps, and means for resampling the second medical image and the one or more second coordinate maps to the common resolution.

Illustrative embodiment 13. The apparatus of any one of illustrative embodiments 10-12, wherein the one or more first coordinate maps define a location of each pixel in the first medical image relative to a reference coordinate system and the one or more second coordinate maps define a location of each pixel in the second medical image relative to the reference coordinate system.

Illustrative embodiment 14. The apparatus of any one of illustrative embodiments 10-13, wherein: the means for encoding the first medical image into a first set of features comprises means for combining features representing the first medical image with temporal information associated with the first medical image to generate the first set of features, and the means for encoding the second medical image into a second set of features comprises means for combining features representing the second medical image with temporal information associated with the second medical image to generate the second set of features.

Illustrative embodiment 15. A non-transitory computer readable medium storing computer program instructions, the computer program instructions when executed by a processor cause the processor to perform operations comprising: receiving 1) a first medical image depicting an anatomical object at a first time and 2) a second medical image depicting the anatomical object at a second time; encoding the first medical image into a first set of features; encoding the second medical image into a second set of features; encoding the first set of features and the second set of features into a set of longitudinal features; performing a medical imaging analysis task on longitudinal changes depicted in the first medical image and the second medical image using a machine learning based network based on the set of longitudinal features; and outputting results of the medical imaging analysis task.

Illustrative embodiment 16. The non-transitory computer readable medium of illustrative embodiment 15, wherein: encoding the first medical image into a first set of features comprises encoding the first medical image with first spatial information to generate the first set of features, and encoding the second medical image into a second set of features comprises encoding the second medical image with second spatial information to generate the second set of features.

Illustrative embodiment 17. The non-transitory computer readable medium of any one of illustrative embodiments 15-16, wherein: encoding the first medical image into a first set of features comprises combining features representing the first medical image with patient demographic information associated with the first medical image to generate the first set of features, and encoding the second medical image into a second set of features comprises combining features representing the second medical image with patient demographic information associated with the second medical image to generate the second set of features.

Illustrative embodiment 18. The non-transitory computer readable medium of any one of illustrative embodiments 15-17, wherein: encoding the first medical image into a first set of features comprises encoding the first medical image using a feature extraction network, encoding the second medical image into a second set of features comprises encoding the second medical image using the feature extraction network, and wherein the feature extraction network is trained to perform a plurality of unsupervised medical imaging analysis tasks.

Illustrative embodiment 19. The non-transitory computer readable medium of any one of illustrative embodiments 15-18, wherein the medical imaging analysis task comprises classification of the longitudinal changes depicted in the first medical image and the second medical image.

Illustrative embodiment 20. The non-transitory computer readable medium of any one of illustrative embodiments 15-19, wherein the anatomical object comprises one or more lesions in a brain of a patient.

The invention claimed is:

1. A computer-implemented method comprising:

receiving 1) a first medical image depicting an anatomical object at a first time and 2) a second medical image depicting the anatomical object at a second time;

encoding the first medical image with first spatial information to generate a first set of features using a machine learning based feature extraction network, the machine learning based feature extraction network receiving as input the first medical image and the first spatial information and generating as output the first set of features;

encoding the second medical image with second spatial information to generate a second set of features using the machine learning based feature extraction network, the machine learning based feature extraction network receiving as input the second medical image and the second spatial information and generating as output the second set of features;

encoding the first set of features and the second set of features into a set of longitudinal features using a machine learning based encoder network;

performing a medical imaging analysis task on longitudinal changes depicted in the first medical image and the second medical image using a machine learning based network based on the set of longitudinal features; and outputting results of the medical imaging analysis task.

2. The computer-implemented method of claim 1, wherein:

encoding the first medical image with first spatial information to generate into a first set of features using a machine learning based feature extraction network comprises:

encoding the first medical image with one or more first coordinate maps, and resampling the first medical image and the one or more first coordinate maps to a common resolution; and encoding the second medical image with second spatial information to generate a second set of features comprises:

encoding the second medical image with one or more second coordinate maps, and resampling the second medical image and the one or more second coordinate maps to the common resolution.

3. The computer-implemented method of claim 2, wherein the one or more first coordinate maps define a location of each pixel in the first medical image relative to a reference coordinate system and the one or more second coordinate maps define a location of each pixel in the second medical image relative to the reference coordinate system.

4. The computer-implemented method of claim 1, wherein:

encoding the first medical image with first spatial information to generate a first set of features using a machine learning based feature extraction network comprises combining features representing the first medical image with temporal information associated with the first medical image to generate the first set of features, and encoding the second medical image with second spatial information to generate a second set of features using the machine learning based feature extraction network comprises combining features representing the second medical image with temporal information associated with the second medical image to generate the second set of features.

5. The computer-implemented method of claim 1, wherein:

encoding the first medical image with first spatial information to generate a first set of features using a machine learning based feature extraction network comprises combining features representing the first medical image with patient demographic information associated with the first medical image to generate the first set of features, and encoding the second medical image with second spatial information to generate a second set of features using the machine learning based feature extraction network comprises combining features representing the second medical image with patient demographic information associated with the second medical image to generate the second set of features.

6. The computer-implemented method of claim 1, wherein the feature extraction network is trained to perform a plurality of unsupervised medical imaging analysis tasks.

7. The computer-implemented method of claim 1, wherein the medical imaging analysis task comprises classification of the longitudinal changes depicted in the first medical image and the second medical image.

8. The computer-implemented method of claim 1, wherein the anatomical object comprises one or more lesions in a brain of a patient.

9. An apparatus comprising:

means for receiving 1) a first medical image depicting an anatomical object at a first time and 2) a second medical image depicting the anatomical object at a second time;

means for encoding the first medical image with first spatial information to generate a first set of features using a machine learning based feature extraction network, the machine learning based feature extraction network receiving as input the first medical image and the first spatial information and generating as output the first set of features;

means for encoding the second medical image with second spatial information to generate a second set of features using the machine learning based feature extraction network, the machine learning based feature extraction network receiving as input the second medical image and the second spatial information and generating as output the second set of features;

means for encoding the first set of features and the second set of features into a set of longitudinal features using a machine learning based encoder network;

means for performing a medical imaging analysis task on longitudinal changes depicted in the first medical image and the second medical image using a machine learning based network based on the set of longitudinal features; and means for outputting results of the medical imaging analysis task.

10. The apparatus of claim 9, wherein:

the means for encoding the first medical image with first spatial information to generate a first set of features using a machine learning based feature extraction network comprises:

means for encoding the first medical image with one or more first coordinate maps, and means for resampling the first medical image and the one or more first coordinate maps to a common resolution; and the means for encoding the second medical image with second spatial information to generate a second set of features comprises:

means for encoding the second medical image with one or more second coordinate maps, and means for resampling the second medical image and the one or more second coordinate maps to the common resolution.

11. The apparatus of claim 10, wherein the one or more first coordinate maps define a location of each pixel in the first medical image relative to a reference coordinate system and the one or more second coordinate maps define a location of each pixel in the second medical image relative to the reference coordinate system.

12. The apparatus of claim 9, wherein:

the means for encoding the first medical image with first spatial information to generate a first set of features using a machine learning based feature extraction network comprises means for combining features representing the first medical image with temporal information associated with the first medical image to generate the first set of features, and the means for encoding the second medical image with second spatial information to generate a second set of features using the machine learning based feature extraction network comprises means for combining features representing the second medical image with temporal information associated with the second medical image to generate the second set of features.

13. A non-transitory computer readable medium storing computer program instructions, the computer program instructions when executed by a processor cause the processor to perform operations comprising:

receiving 1) a first medical image depicting an anatomical object at a first time and 2) a second medical image depicting the anatomical object at a second time;

encoding the first medical image with first spatial information to generate a first set of features using a machine learning based feature extraction network, the machine learning based feature extraction network receiving as input the first medical image and the first spatial information and generating as output the first set of features;

encoding the second medical image with second spatial information to generate a second set of features using the machine learning based feature extraction network, the machine learning based feature extraction network receiving as input the second medical image and the second spatial information and generating as output the second set of features;

encoding the first set of features and the second set of features into a set of longitudinal features using a machine learning based encoder network;

performing a medical imaging analysis task on longitudinal changes depicted in the first medical image and the second medical image using a machine learning based network based on the set of longitudinal features; and outputting results of the medical imaging analysis task.

14. The non-transitory computer readable medium of claim 13, wherein:

encoding the first medical image with first spatial information to generate a first set of features using a machine learning based feature extraction network comprises combining features representing the first medical image with patient demographic information associated with the first medical image to generate the first set of features, and encoding the second medical image with second spatial information to generate a second set of features using the machine learning based feature extraction network comprises combining features representing the second medical image with patient demographic information associated with the second medical image to generate the second set of features.

15. The non-transitory computer readable medium of claim 13, wherein the feature extraction network is trained to perform a plurality of unsupervised medical imaging analysis tasks.

16. The non-transitory computer readable medium of claim 13, wherein the medical imaging analysis task comprises classification of the longitudinal changes depicted in the first medical image and the second medical image.

17. The non-transitory computer readable medium of claim 13, wherein the anatomical object comprises one or more lesions in a brain of a patient.

* * * * *